(12) United States Patent
McAlpine

(10) Patent No.: US 6,537,118 B2
(45) Date of Patent: Mar. 25, 2003

(54) SUBSEA BUOY

(75) Inventor: Robert McAlpine, Aberdeen (GB)

(73) Assignee: Balmoral Group Ltd., Aberdeen (GB)

( * ) Notice: Subject to any disclaimer, the term of this patent is extended or adjusted under 35 U.S.C. 154(b) by 0 days.

(21) Appl. No.: 09/985,794

(22) Filed: Nov. 6, 2001

(65) Prior Publication Data

US 2002/0072283 A1 Jun. 13, 2002

(30) Foreign Application Priority Data

Nov. 8, 2000 (GB) .............................................. 0027305

(51) Int. Cl.⁷ .............................................. B63B 22/08
(52) U.S. Cl. ................... 441/7; 441/2; 441/21
(58) Field of Search ............................. 441/2, 6, 7, 10, 441/21; 114/252, 254, 247

(56) References Cited

U.S. PATENT DOCUMENTS

| 3,992,737 A | * | 11/1976 | Duel et al. ..................... 441/21 |
| 4,067,199 A | * | 1/1978 | Jegousse ..................... 441/10 |
| 4,096,818 A | | 6/1978 | Wameling |
| 4,107,802 A | | 8/1978 | Patinet et al. |
| 4,193,057 A | * | 3/1980 | Bennett et al. ................. 441/11 |
| 4,330,895 A | * | 5/1982 | Putman et al. ............... 114/311 |
| 4,563,108 A | | 1/1986 | Ayers |
| 5,108,326 A | | 4/1992 | Seiler |
| 6,052,332 A | * | 4/2000 | Obara ........................... 367/1 |

FOREIGN PATENT DOCUMENTS

| DE | 197 10 465 A1 | | 9/1998 |
| GB | 2057364 A | * | 4/1981 |

* cited by examiner

Primary Examiner—S. Joseph Morano
Assistant Examiner—Lars A. Olson
(74) Attorney, Agent, or Firm—Banner & Witcoff, Ltd.

(57) ABSTRACT

A subsea buoy for use in maneuvering a submerged object, the buoy comprising a buoyant body, a first frangible link for securing said buoy to the object, means for rupturing said first frangible link, a drogue secured to said buoyant body by a second frangible link and by means allowing said drogue to move on rupture of said second frangible link from a first configuration to a second configuration, where said drogue is spaced apart from said buoyant body, and a third frangible link extending between the object and said drogue.

10 Claims, 2 Drawing Sheets

SUBSEA BUOY

This non-provisional application claims priority based on Foreign United Kingdom Patent 00 27 305.2, Nov. 8, 2000.

1. Field of the Invention

This invention relates to subsea buoys.

2. Background and Prior Art

Subsea pipelines can be manoeuvred by securing buoyancy to them and moving them while they are underwater. In some case they are manoeuvred at great depth for example 1000 m or more. Once the pipeline is in the desired position the buoyancy can be released. It rises to the surface and may be recovered for re-use. The buoys are often large and ascend on release very rapidly. The path of the buoy is difficult to predict and the released buoys can present a major hazard to any surface ships or craft in the vicinity. The invention seeks to reduce this problem.

U.S. Pat. No. 4 096 818 describes a drogue type deceleration device which is actuated at a desired depth using a pressure control switch.

SUMMARY OF THE INVENTION

According to some embodiments of the invention there is provided subsea buoy for use in manoeuvring a submerged object, the buoy comprising a) a buoyant body, b) a first frangible link for securing the buoy to the object, c) means for rupturing the first frangible link, d) a drogue secured to the buoyant body by a second frangible link and by e) means allowing the drogue to move on rupture of the second frangible link from a first configuration to a second configuration where the drogue is spaced apart from the buoyant body and f) a third frangible link extending between the object and the drogue.

BRIEF DESCRIPTION OF THE FIGURES

Embodiments of the invention will be described by way of non-limiting example by reference to the accompanying figures of which

DESCRIPTION OF PREFERRED EMBODIMENTS

Figure 1:
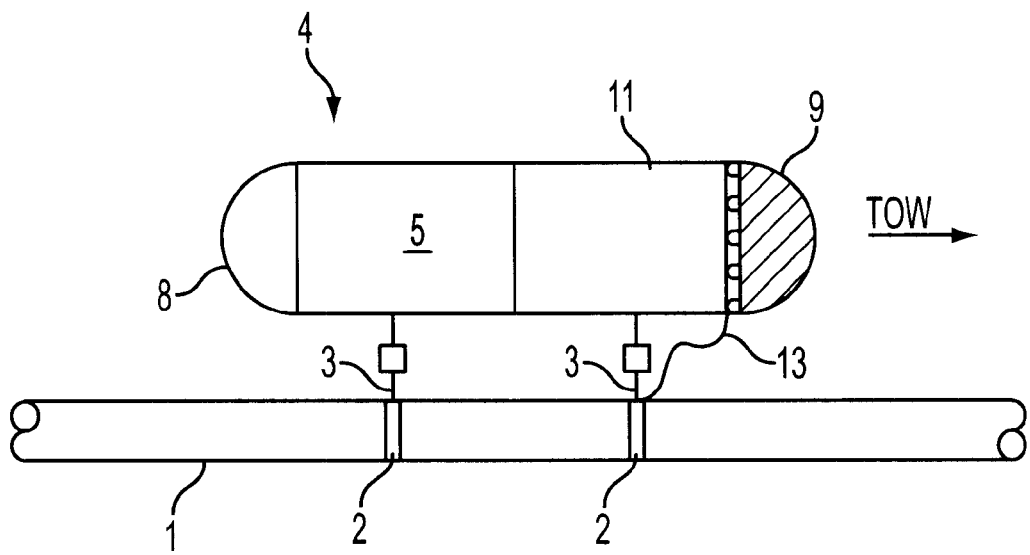
FIG. 1 is a side elevation of a pipe with a buoy of the invention attached.

Pipe 1 is provided with one or more supports. In the illustrated embodiments the supports comprise clamps 2 extending around the pipe. Clamp 2 may comprise a strap and tensioning means. It will however be apparent to the skilled worker in the art that it is not essential to use a clamp and for example an eye could be provided.

Each support is provided with a first frangible link 3. Means for rupturing the frangible link are provided. In some embodiments of the invention the frangible link is ruptured locally for example using an ROV or by diver. In other embodiments of the invention the first frangible link is ruptured remotely. This can be done for example by an electrical signal or by a mechanical linkage. Those skilled in the art will have no difficulty in devising suitable frangible links and means for actuating them.

A first end of the first frangible link is secured to the support 2. The other end of the first frangible link 3 is connected to buoy 4. Buoy 4 comprises a buoyant body 5 on which is mounted drogue 9. In some embodiments of the invention buoyant body comprises a plurality of buoyant elements joined together. This is preferred since it allows a wide range of buoyant bodies of differing buoyancy to be made from a small range of elements joined together in various permutations and combinations.

In the illustrated embodiment body 5 is cylindrical with first and second hemispherical ends 7,8. It will be apparent to the skilled that other shapes of buoy could be employed. Received over an end 7 of the buoy is a drogue 9. Drogue 9 is preferably rigid or semi-rigid but this is not essential. Drogue 9 could for example be made of glass reinforced plastics material. Drogue 9 has an open mouth 10. In the undeployed configuration of the illustrated embodiment drogue 9 is positioned with mouth 10 received over end 7. In the illustrated embodiment drogue 9 is hemispherical. Those skilled will be able to devise other shapes such as for example pyramidal. In some embodiments of the invention means for expanding the drogue after deployment are provided.

Drogue 9 is secured to buoy 4 by second frangible link 11. Means for rupturing the second frangible link need not be provided. As will become apparent hereinafter rupture can be caused by deployment. In the illustrated embodiment the second frangible link comprises a length of line passing through eyelets in the body and the drogue. Rupture occurs as the line, which may be of a stainless steel tears through the structure of the drogue and/or buoy. Those skilled will be able to devise other ways of providing a second frangible link. Second frangible link 11 may, for example, comprise one or more lengths of relatively low breaking strain line which ruptures rather than the drogue and/or body rupturing.

Figure 3:
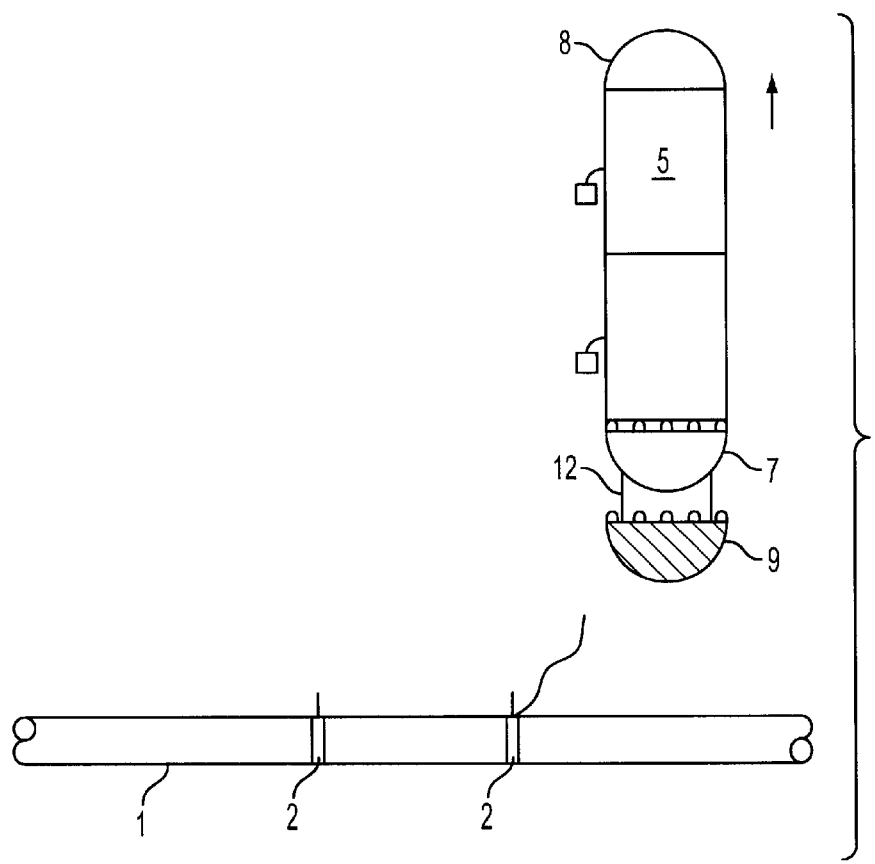
FIG. 3 is a side elevation of the buoy of FIGS. 1 and 2 completely released from the pipe with a drogue deployed and FIG. 4 is a side elevation of a further buoy of the invention with two drogues deployed.
Figure 4:
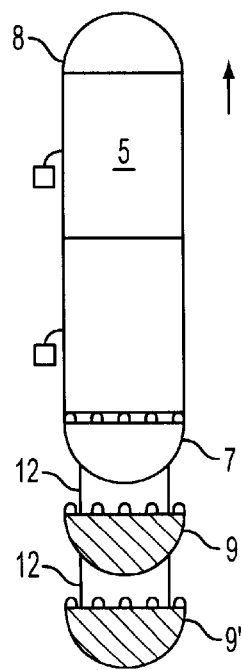

Drogue 9 is also secured to the buoy by means 12 allowing the drogue to adopt a first configuration where the mouth of the drogue abuts or nearly abuts the buoy and a second configuration where the drogue is spaced apart from the buoy as shown in FIGS. 3 and 4. In the illustrated embodiment means 12 are flexible and may for example comprise high breaking strain line. Means 12 need not however be flexible and could for example comprise bar with a stop at the end remote from the buoy Drogue 9 is secured to pipe 1 by a third frangible link 13. In the illustrated embodiment third frangible link 13 comprises the line threaded through eyelets of the drogue and buoy. Rupture of this link can be by rupture of the line. In the alternative embodiment hereinbefore described in which rupture of the second frangible link is by rupture of the line, the line of the third frangible link has a higher breaking strain than second frangible link 11 but is ruptured by a strain less than the buoyancy of buoy 4. In other embodiments of the invention, means for rupturing the third frangible link could be provided. In the illustrated embodiment third frangible link comprises line.

Figure 2:
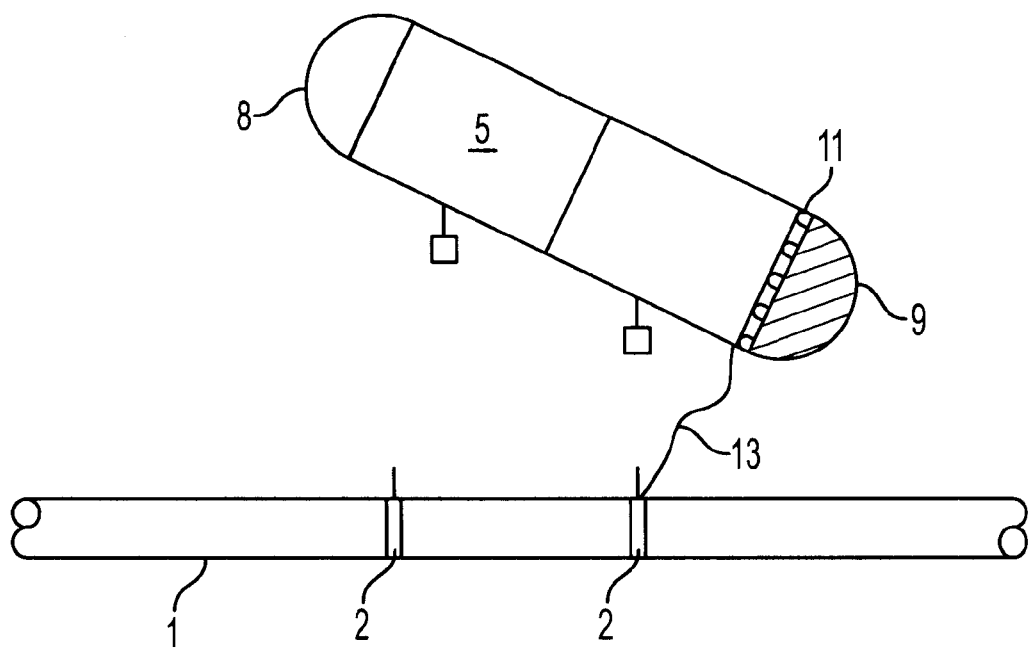
FIG. 2 is a side elevation of the buoy of FIG. 1 partially released from the pipe.

In use the pipe can be supported in the water by buoy 4 (in many embodiments of the invention a plurality of buoys are provided). Pipe 1 can be moved in the direction of arrow TOW in FIG. 1. When the pipe is in the desired location the first frangible link is ruptured. The buoy moves upward relative to the pipe adopting the configuration of FIG. 2. As the buoy continues to move upward strain is imposed on the second and third frangible links. The second frangible link ruptures causing the drogue to deploy adopting the second configuration. The strain on the third frangible link increases until it ruptures and the buoy rises to the surface.

The drag coefficient of the buoy with the drogue deployed can be much higher than it would be without deployment. This means that the buoy will rise to the surface in a slower and more controlled manner than if the drogue was not deployed.

The drag coefficient can be increased still further by for example providing two nested drogues 9, 9' which deploy to the configuration shown in FIG. 4.

Those skilled in the art in the art will have no difficulty in devising modifications. In particular it will be apparent that the buoy can be carried on subsea objects other than pipes.

What we claim is:

1. A subsea buoy for use in maneuvering a submerged object, the buoy comprising
   a) a buoyant body,
   b) a first frangible link for securing said buoy to the object,
   c) means for rupturing said first frangible link,
   d) a drogue secured to said buoyant body by a second frangible link and by
   e) means allowing said drogue to move on rupture of said second frangible link from a first configuration to a second configuration where said drogue is spaced apart from said buoyant body and
   f) a third frangible link extending between the object and said drogue.

2. The subsea buoy of claim 1 wherein said first frangible link is constructed so as to be ruptured remotely.

3. The subsea buoy of claim 2 wherein said first frangible link is constructed so as to be ruptured by an electrical signal.

4. The subsea buoy of claim 1 wherein said drogue is rigid.

5. The subsea buoy of claim 1 wherein said drogue is semi rigid.

6. The subsea buoy of claim 1 where said drogue comprises glass reinforced plastics material.

7. The subsea buoy of claim 1 wherein a plurality of holes are provided in said body and said drogue and said second frangible link comprises line passing through said holes.

8. The subsea buoy of claim 7 wherein said line is of stainless steel.

9. The subsea buoy of claim 1 wherein the third frangible link comprises line.

10. The subsea buoy of claim 1 comprising two nested drogues.

* * * * *